United States Patent
Roberts

(10) Patent No.: US 10,825,477 B2
(45) Date of Patent: Nov. 3, 2020

(54) RAID STORAGE SYSTEM WITH LOGICAL DATA GROUP PRIORITY

(71) Applicant: Western Digital Technologies, Inc., San Jose, CA (US)

(72) Inventor: Adam Roberts, Moncure, NC (US)

(73) Assignee: Western Digital Technologies, Inc., San Jose, CA (US)

(*) Notice: Subject to any disclaimer, the term of this patent is extended or adjusted under 35 U.S.C. 154(b) by 155 days.

(21) Appl. No.: 16/053,750

(22) Filed: Aug. 2, 2018

(65) Prior Publication Data

US 2020/0043524 A1    Feb. 6, 2020

(51) Int. Cl.
*G11B 20/10* (2006.01)
*G11B 19/20* (2006.01)

(52) U.S. Cl.
CPC ...... *G11B 20/10009* (2013.01); *G11B 19/209* (2013.01); *G11B 2220/415* (2013.01)

(58) Field of Classification Search
None
See application file for complete search history.

(56) References Cited

U.S. PATENT DOCUMENTS

| | | | | |
|---|---|---|---|---|
| 5,790,773 A * | 8/1998 | DeKoning | ......... | G11B 20/1833 714/6.22 |
| 7,281,160 B2 * | 10/2007 | Stewart | ............... | G06F 11/2087 714/6.13 |
| 7,849,356 B2 * | 12/2010 | Jones | ................... | G06F 11/1076 714/6.12 |
| 7,984,325 B2 * | 7/2011 | Fukutomi | ............. | G06F 11/108 714/6.22 |
| 8,015,440 B2 * | 9/2011 | Flynn | .................... | G06F 3/0608 714/6.24 |
| 8,726,070 B2 * | 5/2014 | Nelogal | .............. | G06F 11/1092 714/52 |
| 8,751,862 B2 * | 6/2014 | Cherian | .............. | G06F 11/1092 714/6.24 |
| 8,984,371 B2 * | 3/2015 | Gladwin | ............... | H04L 65/602 714/763 |
| 9,325,790 B1 | 4/2016 | Le et al. | | |
| 9,396,205 B1 | 7/2016 | Lewis et al. | | |
| 9,454,433 B2 * | 9/2016 | Dennett | ............... | G06F 11/108 |
| 9,542,272 B2 * | 1/2017 | Krishnamurthy | ... | G06F 11/1092 |
| 9,715,431 B2 | 7/2017 | Chadwell | | |
| 9,990,263 B1 | 6/2018 | Tian et al. | | |
| 10,268,449 B1 | 4/2019 | Wang et al. | | |
| 2005/0102552 A1 * | 5/2005 | Horn | ................... | G06F 11/1092 714/6.22 |

(Continued)

*Primary Examiner* — Amine Riad
(74) *Attorney, Agent, or Firm* — Patent Law Works LLP

(57) ABSTRACT

Example redundant array of independent disks (RAID) storage systems and methods provide rebuild of logical data groups in priority order. Storage devices are configured as a storage array for storing logical data groups distributed among the storage devices. The logical data groups are written in a configuration of RAID stripes in the storage devices. A logical group index includes a logical group map for each logical data group and identifies corresponding logical blocks. When a storage device fails, the rebuild queue is ordered based on the priority of the logical data groups and rebuild to the replacement storage device is completed in the priority order.

20 Claims, 7 Drawing Sheets

(56) References Cited

U.S. PATENT DOCUMENTS

| | | | |
|---|---|---|---|
| 2009/0044043 A1* | 2/2009 | Cherian | G06F 11/1092 714/6.12 |
| 2009/0271659 A1 | 10/2009 | Troppens et al. | |
| 2011/0126045 A1* | 5/2011 | Bennett | G06F 11/1068 714/6.22 |
| 2012/0079317 A1 | 3/2012 | Nelogal et al. | |
| 2013/0024723 A1* | 1/2013 | Govindasamy | G06F 11/1084 714/6.22 |
| 2013/0047028 A1 | 2/2013 | Daikokuya et al. | |
| 2013/0054907 A1 | 2/2013 | Ikeuchi et al. | |
| 2013/0054913 A1 | 2/2013 | Maeda et al. | |
| 2013/0238928 A1* | 9/2013 | Watanabe | G06F 11/1092 714/6.21 |
| 2014/0281689 A1 | 9/2014 | Fischer | |
| 2014/0325262 A1* | 10/2014 | Cooper | G06F 11/108 714/6.22 |
| 2014/0337666 A1* | 11/2014 | Resch | G06F 11/1004 714/6.22 |
| 2015/0301895 A1* | 10/2015 | Dennett | G06F 11/1092 714/6.24 |
| 2016/0034370 A1* | 2/2016 | Nanduri | G06F 11/2082 714/6.22 |
| 2016/0110264 A1 | 4/2016 | Mehta et al. | |
| 2016/0342470 A1 | 11/2016 | Cudak et al. | |
| 2016/0378339 A1 | 12/2016 | Andre et al. | |
| 2017/0091052 A1 | 3/2017 | Gao et al. | |
| 2017/0185312 A1 | 6/2017 | Smith et al. | |
| 2017/0242745 A1 | 8/2017 | Sherlock et al. | |
| 2017/0270018 A1 | 9/2017 | Xiao et al. | |
| 2018/0101456 A1* | 4/2018 | Critchley | G06F 11/2058 |
| 2018/0152204 A1 | 5/2018 | Halbawi et al. | |
| 2018/0300212 A1 | 10/2018 | Gong et al. | |
| 2018/0314531 A1 | 11/2018 | Rhodes et al. | |
| 2019/0012236 A1 | 1/2019 | Hitron et al. | |
| 2019/0179706 A1 | 6/2019 | Bono et al. | |
| 2020/0042215 A1* | 2/2020 | Roberts | G06F 3/0607 |
| 2020/0042388 A1* | 2/2020 | Roberts | G06F 11/2094 |

* cited by examiner

RAID STORAGE SYSTEM WITH LOGICAL DATA GROUP PRIORITY

TECHNICAL FIELD

The present disclosure generally relates to data storage, and in a more particular example, to redundant array of independent disks (RAID) storage and rebuild.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

Groups of objects may be further organized into logical data groups called containers or buckets. Definition of these buckets may be determined by a combination of a host organization's implementation and data owner configuration, generally based on data ownership/access, application relationships, data service contracts/terms, and/or other considerations. In other configurations, including those using file system storage, logical data groups may be implemented across data stores as namespaces and, more specifically, global namespaces.

Such large-scale storage systems generally distribute the stored data objects in the object storage system over multiple storage elements, such as for example disk drives (solid-state drives, hard disk drives, hybrid drives, tape drives, etc.), or multiple components such as storage nodes comprising a plurality of such storage elements. However, as the number of storage elements in such a distributed object storage system increase, equally the probability of failure of one or more of these storage elements increases. To cope with this issue, distributed object storage system generally use some level of redundancy, which allows the system to cope with a failure of one or more storage elements without data loss. For example, such storage systems may use some combination of object replication and RAID configurations within and across storage nodes.

Some storage systems may be arranged in an array of drives interconnected by a common communication fabric and, in many cases, controlled by a storage controller, RAID controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives). After a drive has failed, the RAID configuration may support a rebuild process to a replacement drive, such as a hot spare, or across existing drives with unused capacity.

The RAID rebuild process may proceed across RAID stripes that include data units on the failed drive (along with data units and/or parity information stored on the remaining drives). The order of the RAID rebuild may be based on the arrangement of RAID stripes and the rebuild process may attempt to rebuild the entire failed drive before returning the array and/or the drive to read/write operation. However, RAID rebuild will sometimes fail before all RAID stripes are rebuilt.

A need exists for at least improved rebuild of failed storage devices to enable improved recovery of logical data groups. For example, when rebuilding a RAID array containing logical data groups, a need exists to recover and use logical data groups without requiring a full RAID rebuild.

SUMMARY

Various aspects for RAID data rebuild and use involving logical data groups in RAID storage systems are described. In an innovative aspect, a plurality of storage devices are configured as a storage array for storing a plurality of logical data groups distributed among the plurality of storage devices. A redundant array of independent disks (RAID) controller is configured to write the plurality of logical data groups in a configuration of RAID stripes across at least one RAID group in the plurality of storage devices. The RAID controller comprises a rebuild module configured to rebuild a failed storage device from the plurality of storage devices based on the configuration of RAID stripes and a rebuild queue defining a rebuild order for the logical blocks of the failed storage device. A logical group index comprises a logical group map for each of the plurality of logical data groups. The logical group map identifies the logical blocks corresponding to each of the plurality of logical data groups. A logical group accelerator module is configured to order the rebuild queue based on the plurality of logical data groups. A first priority set of logical blocks corresponding to at least one of the plurality of logical data groups are ordered ahead of logical blocks not in the first priority set in the rebuild queue. The rebuild module is further configured to rebuild the first priority set before remaining logical data groups from the plurality of logical data groups.

In various embodiments, a storage access controller may be configured to enable the first priority set to be used for production read/write operations in response to the first priority set being rebuilt and before remaining logical data groups from the plurality of data groups are rebuilt. The storage access controller may be further configured for redefining the storage array to include only the first priority set in response to enabling the first priority set to be used for production read/write operations. The first priority set may be enabled for use for production read/write operations at a first time following the first priority set being rebuilt and before remaining logical data groups are rebuilt. A deferred rebuild scheduler may be configured to suspend rebuild of remaining logical data groups at the first time and resume rebuild of remaining logical data groups at a later second time. The first time may correspond to a first production demand for read/write operations to the first priority set. The later second time may correspond to a second production demand for read/write operations to the first priority set. The second production demand may be less than the first production demand. The logical group index may include a production demand history for at least one of the plurality of logical data groups and selection of the later second time is based on the production demand history for at least one of the logical data groups in the first priority set.

In some embodiments, the plurality of logical data groups may include a first logical data group in the first priority set and a second logical data group in a second priority set. A storage access controller may be configured to enable the first priority set to be used for production read/write operations in response to the first priority set being rebuilt at a first rebuild time and enable the second priority set to be used for production read/write operations in response to the second priority set being rebuilt at a second rebuild time that is after the first rebuild time.

In various embodiments, the logical group index may include a group priority for each of the plurality of logical data groups. The logical group accelerator may be further configured to order the rebuild queue based on the group priority of each of the plurality of logical data groups for rebuilding the plurality of logical data groups in a priority order. The first priority set may include at least two logical data groups from the plurality of logical data groups, where the group priorities of the at least two logical data groups are equal and the group priorities of the remaining logical data groups are different than the group priorities of the at least two logical data groups in the first priority set. The RAID stripes containing logical blocks for the at least two logical data groups in the first priority set may be rebuilt in a logical group rebuild order that interleaves RAID stripes from the at least two logical data groups.

In another innovative aspect, a computer-implemented method provides rebuild of logical data groups. A logical group index is accessed for a plurality of storage devices configured as a storage array for storing a plurality of logical data groups distributed among the plurality of storage devices. The logical group index comprises a logical group map for each of the plurality of logical data groups. The logical group map identifies logical blocks corresponding to each of the plurality of logical data groups. The plurality of logical data groups are written in a configuration of redundant array of independent disks (RAID) stripes across at least one RAID group in the plurality of storage devices. In response to a failed storage device failing among the plurality of storage devices, a replacement storage device is identified for rebuilding the failed storage device. A rebuild queue is ordered based on the plurality of logical data groups. A first priority set of logical blocks corresponding to at least one of the plurality of logical data groups are ordered ahead of logical blocks not in the first priority set in the rebuild queue. The first priority set is rebuilt before remaining logical data groups from the plurality of logical data groups. The failed storage device is rebuilt to the replacement storage device based on the configuration of RAID stripes in a priority order of the rebuild queue.

In various embodiments, the first priority set may be enabled to be used for production read/write operations in response to the first priority set being rebuilt and before remaining logical data groups from the plurality of data groups are rebuilt. The storage array may be redefined to include only the first priority set in response to enabling the first priority set to be used for production read/write operations. The first priority set may be enabled for use for production read/write operations at a first time following the first priority set being rebuilt and before remaining logical data groups are rebuilt. Rebuild of remaining logical data groups may be suspended at the first time. A later second time may be selected. Rebuild of remaining logical data groups may be resumed at the later second time. The first time may correspond to a first production demand for read/write operations to the first priority group. The later second time may correspond to a second production demand for read/write operations to the first priority group and the second production demand may be less than the first production demand. The logical group index may include a production demand history for at least one of the plurality of logical data groups. The later second time may be selected based on the production demand history for at least one of the logical data groups in the first priority group.

In some embodiments, the plurality of logical data groups includes a first logical data group in the first priority set and a second logical data group in a second priority set. The first priority set is enabled to be used for production read/write operations in response to the first priority set being rebuilt at a first rebuild time. The second priority set may be enabled to be used for production read/write operations in response to the second priority set being rebuilt at a second rebuild time that is after the first rebuild time.

In various embodiments, the logical group index may include a group priority for each of the plurality of logical data groups. The rebuild queue may be based on the group priority of each of the plurality of logical data groups for rebuilding the plurality of logical data groups in the priority order. The first priority set may include at least two logical data groups from the plurality of logical data groups. The group priorities of the at least two logical data groups may be equal and the group priorities of the remaining logical data groups may be different than the group priorities of the at least two logical data groups in the first priority set.

In yet another innovative aspect, a system provides rebuild of logical data groups. Means are provided for accessing a logical group index for a plurality of storage devices configured as a storage array for storing a plurality of logical data groups distributed among the plurality of storage devices. The logical group index may comprise a logical group map for each of the plurality of logical data groups. The logical group map may identify logical blocks corresponding to each of the plurality of logical data groups. Means are provided for writing the plurality of logical data groups in a configuration of redundant array of independent disks (RAID) stripes across at least one RAID group in the plurality of storage devices. Means are provided for identifying a replacement storage device for rebuilding the failed storage device. Means are provided for ordering a rebuild queue based on the plurality of logical data groups. A first priority set of logical blocks corresponding to at least one of the plurality of logical data groups are ordered ahead of logical blocks not in the first priority set in the rebuild queue. The first priority set is rebuilt before remaining logical data groups from the plurality of logical data groups. Means are provided for rebuilding the failed storage device to the replacement storage device based on the configuration of RAID stripes in a priority order of the rebuild queue.

The various embodiments advantageously apply the teachings of RAID storage networks and/or systems to improve the functionality of such computer systems. The various embodiments include operations to overcome or at least reduce the issues in the previous storage networks and/or systems discussed above and, accordingly, are more robust than other computing networks. That is, the various embodiments disclosed herein include hardware and/or software with functionality to improve the recovery of logical data groups, based on ordering RAID rebuilds for the completion of logical data groups. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
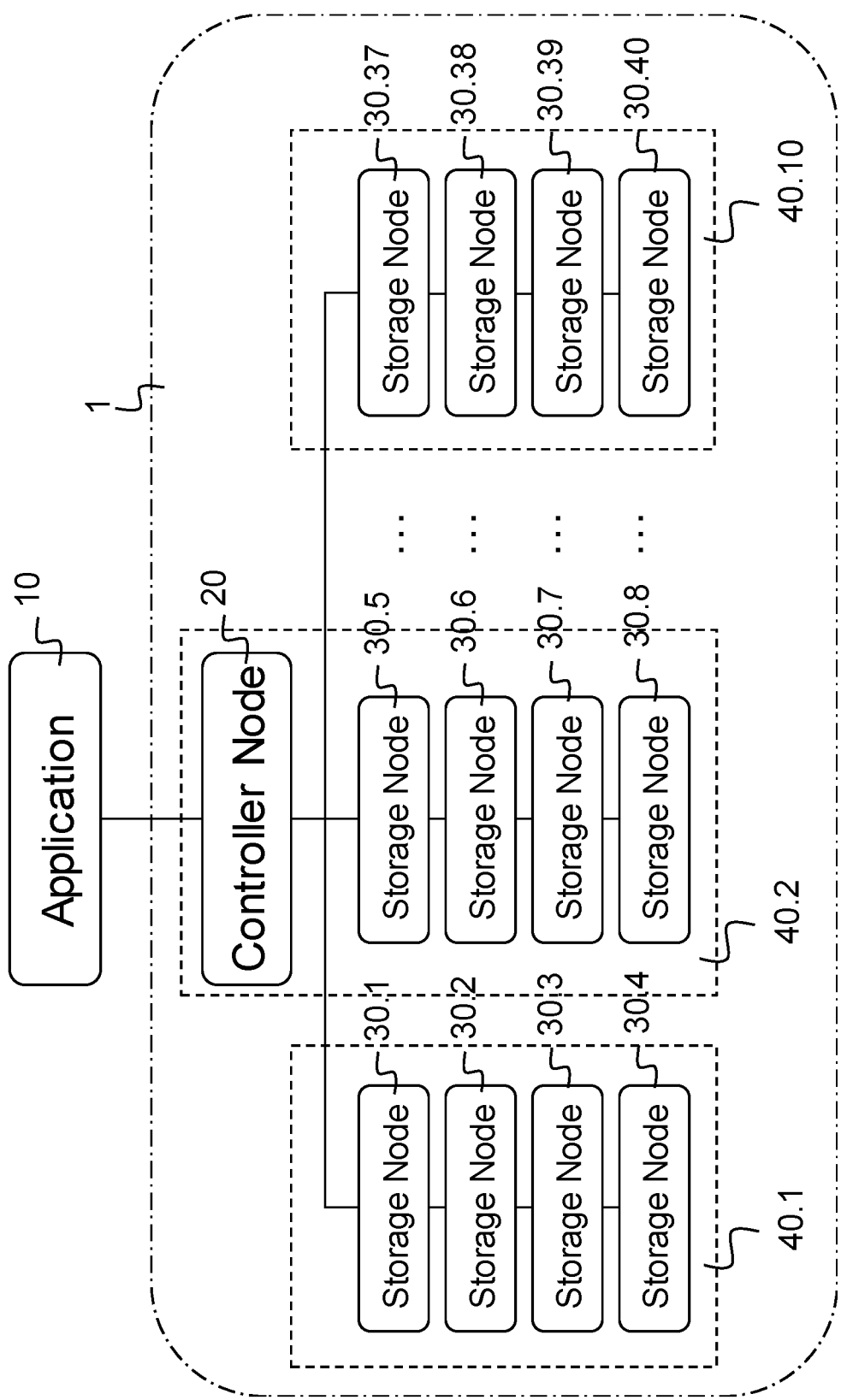
FIG. 1 schematically illustrates an example embodiment of a storage system.

FIG. 1 shows an embodiment of an example storage system 1, such as a storage system implementing one or more RAID configurations. According to this embodiment, the storage system 1 may be implemented as an object storage system which is coupled to an application 10 for transferring data objects. The connection between the storage system 1 and the application 10 could, for example, be implemented as a suitable data communication network. Such an application 10 could, for example, be a dedicated software application running on a computing device, such as a personal computer, a laptop, a wireless telephone, a personal digital assistant or any other type of communication device that is able to interface directly with the storage system 1. However, according to alternative embodiments, the application 10 could for example comprise a suitable file system which enables a general purpose software application to interface with the storage system 1, an application programming interface (API) library for the storage system 1, etc.

As further shown in FIG. 1, the storage system 1 comprises a controller node 20 and a plurality of storage nodes 30.1-30.40 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Controller node 20, storage nodes 30 and the device comprising application 10 may connect to the data communication network by means of suitable wired, wireless, optical, etc. network connections or any suitable combination of such network connections. Although the embodiment of FIG. 1 shows only a single controller node 20 and forty storage nodes 30, according to alternative embodiments the storage system 1 could comprise any other suitable number of storage nodes 30 and, for example, two, three or more controller nodes 20 coupled to these storage nodes 30.

These controller nodes 20 and storage nodes 30 can be built as general-purpose computers, however more frequently they are physically adapted for arrangement in large data centers, where they are arranged in modular racks 40 comprising standard dimensions. Exemplary controller nodes 20 and storage nodes 30 may be dimensioned to take up a single unit of such rack 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary controller node 20 may comprise high-performance servers and provide network access to applications 10 over multiple high bandwidth Ethernet network interfaces. Data can be transferred between applications 10 and such a controller node 20 by means of a variety of network protocols including hypertext transfer protocol (HTTP)/representational state transfer (REST) object interfaces, language-specific interfaces such as Microsoft.Net, Python or C, etc. Additionally, such controller nodes may comprise additional high bandwidth Ethernet ports to interface with the storage nodes 30. In some embodiments, HTTP/REST protocols complying with S3 may enable data transfer through a REST application protocol interfaces (API). Preferably, such controller nodes 20 operate as a highly available cluster of controller nodes, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
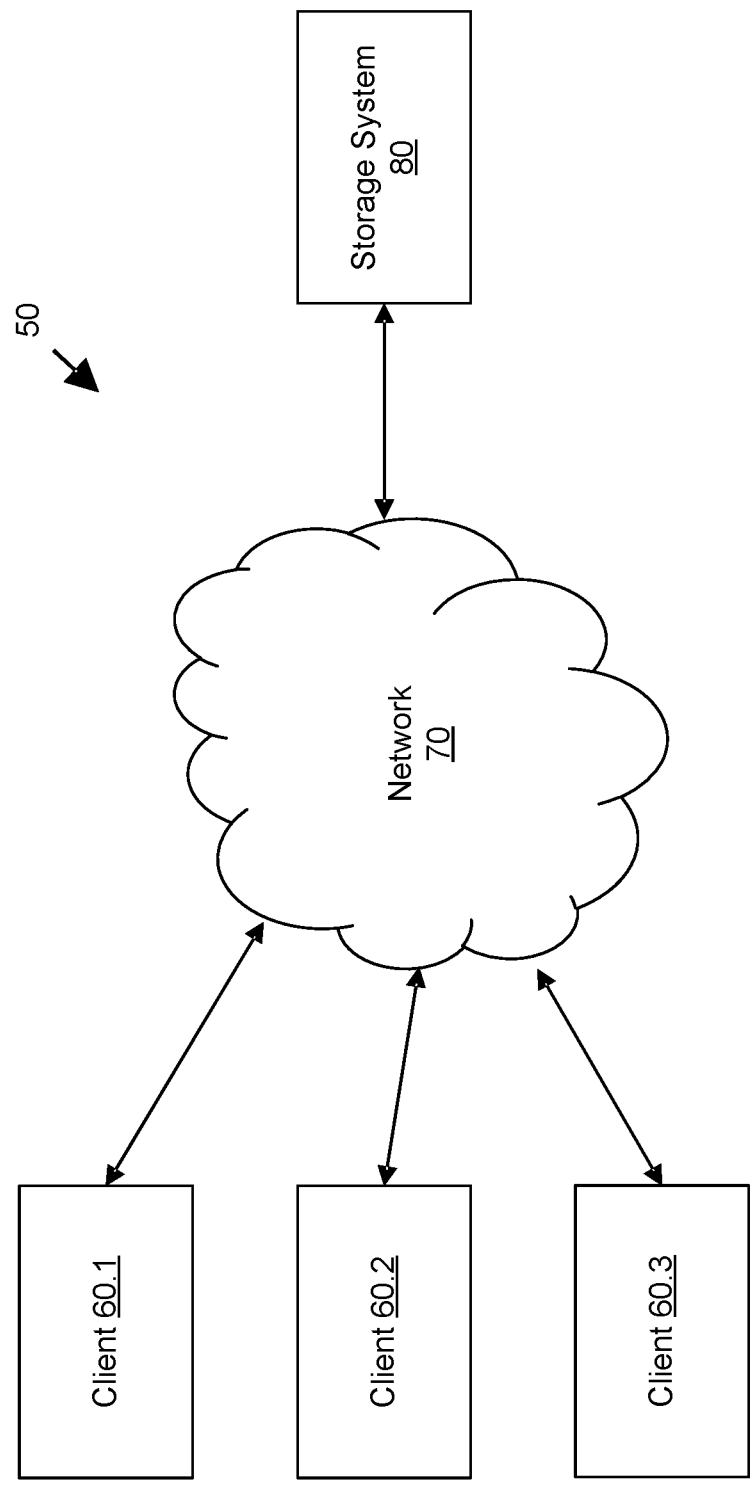
FIG. 2 schematically illustrates an example client architecture in which some embodiments of the storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications, such as application 10 in FIG. 1, to use or manage a distributed storage system, such as storage system 1 in FIG. 1.

Figure 3:
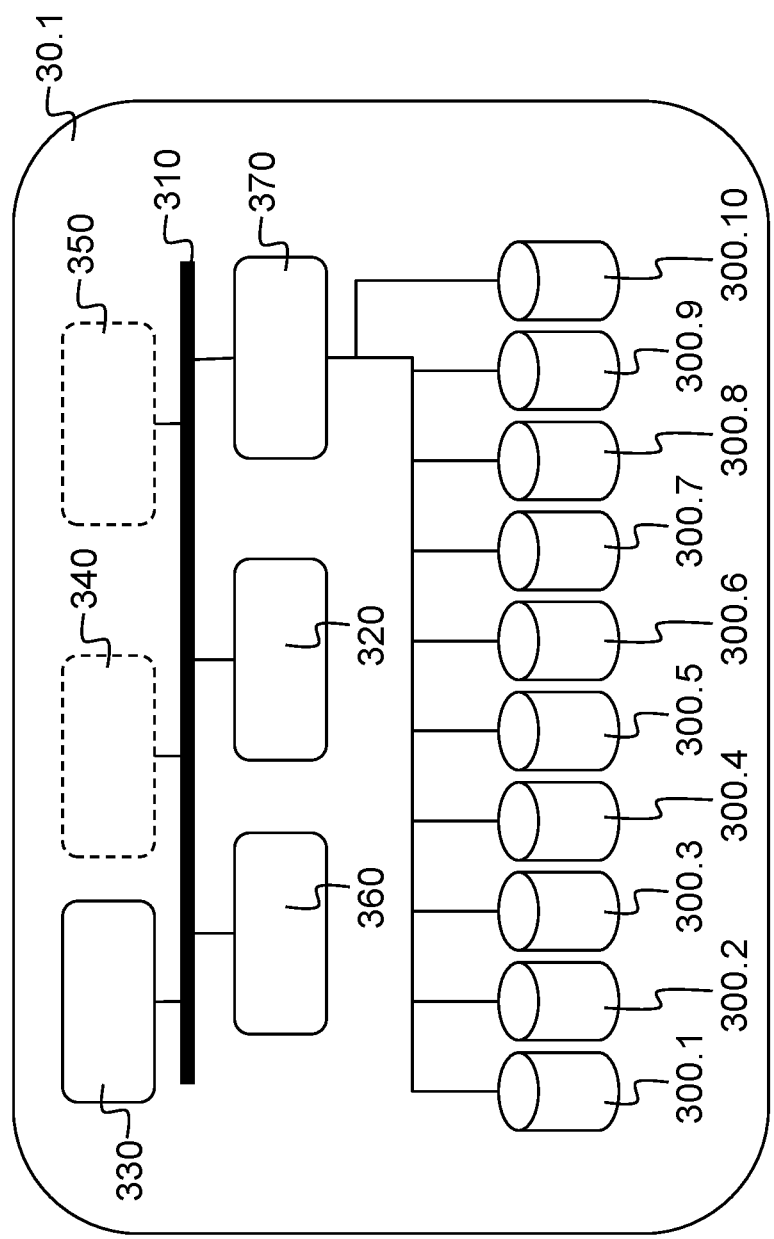
FIG. 3 schematically illustrates an example embodiment of a storage node of the storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 3, such a storage node 30.1 could comprise ten or twelve 3 TB SATA disk drives as storage elements 300.1-300.10 and in this way storage node 30.1 would provide a storage capacity of 30 TB or 36 TB to the storage system 1. According to the exemplary embodiment of FIG. 1 and in the event that storage nodes 30.2-30.40 are identical to storage node 30.1 and each comprise a storage capacity of 36 TB, the storage system 1 would then have a total storage capacity of 1440 TB.

As is clear from FIGS. 1 and 3 the storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the storage system. Each of the storage nodes 30 may comprise a share of these storage elements 300. These storage elements 300 may provide redundant storage in one or more RAID configurations. For example, the ten storage elements 300 in storage node 30.1 may be configured as a storage array implementing a RAID group across the ten storage devices.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. In some embodiments, the storage system 1 may be operable as an object storage system to store and retrieve a data object comprising data (e.g. 64 megabytes (MB) of binary data) and a data object identifier for addressing this data object, for example, a universally unique identifier such as a globally unique identifier (GUID). Storing the data offered for storage by the application 10 in the form of a data object, also referred to as object storage, may have specific advantages over other storage schemes such as conventional block-based storage or conventional file-based storage.

The storage elements 300 or a portion thereof may be redundant and operate independently of one another. This means that if one particular storage element 300 fails its function it can easily be taken on by another storage element 300 in the storage system 1. The storage elements 300 may be capable of providing redundancy without having to work in synchronism, as is for example the case in some RAID configurations, which sometimes even require disc spindle rotation to be synchronised. Furthermore, the independent and redundant operation of the storage elements 300 may allow a suitable mix of types of storage elements 300 to be used in a particular storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the storage system 1 as it allows for adding or removing storage elements 300 without imposing specific requirements to their design in correlation to other storage elements 300 already in use in the storage system 1.

Figure 4:
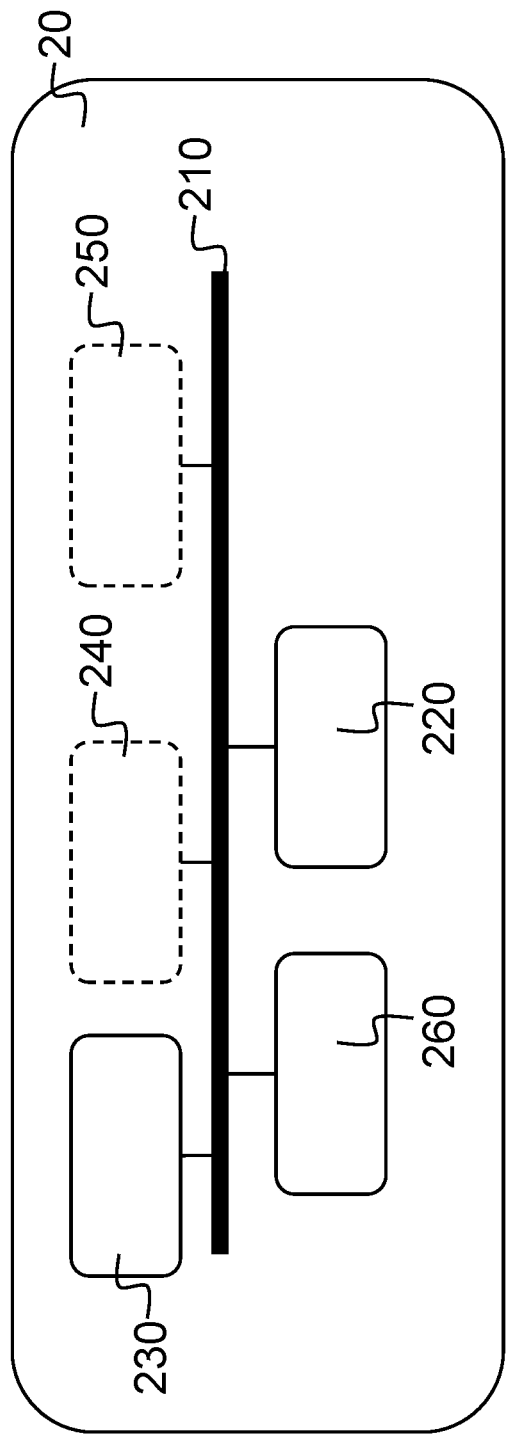
FIG. 4 schematically illustrates an example embodiment of a controller node of the storage system of FIG. 1.

FIG. 4 shows a schematic representation of an embodiment of the controller node 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment, the controller node 20 could have an identical design as a storage node 30, or according to still a further alternative embodiment one of the storage nodes 30 of the storage system could perform both the function of a controller node 20 and a storage node 30. According to still further embodiments, the components of the controller node 20 as described in more detail below could be distributed amongst a plurality of controller nodes 20 and/or storage nodes 30 in any suitable way. According to still a further embodiment, the device on which the application 10 runs is a controller node 20.

Figure 5:
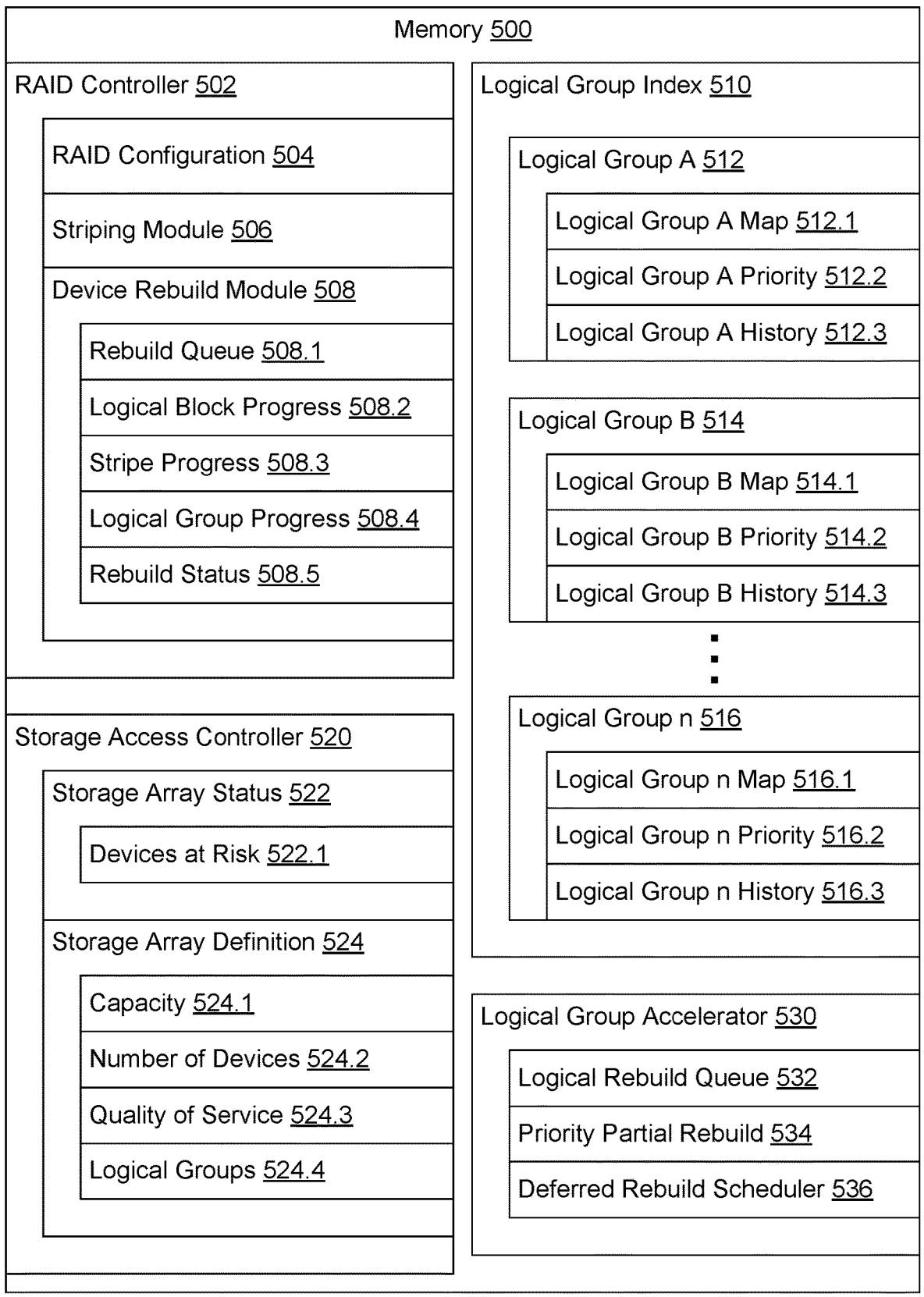
FIG. 5 schematically illustrates some example components of a memory for RAID rebuild with logical data groups, such as may operate in one or more nodes of the storage system of FIG. 1.

FIG. 5 schematically shows a memory 500 that may be implemented in one or more nodes of a storage system, such as those shown in FIGS. 1-4. Memory 500 includes components for using RAID to store and rebuild logical data groups. In some embodiments, memory 500 may be included in one or more of storage nodes 30 and/or controller node 20 to implement RAID in some or all of storage elements 300. Memory 500 may be instantiated in memory 230 of controller node 20 or memory 330 of storage nodes 30 and executed by processor 220 or processor 320. In some embodiments, memory 500 may be implemented in a separate RAID controller node (not shown) configured similarly to controller node 20.

In some embodiments, memory 500 may include a RAID controller 502, a logical group index 510, a storage access controller 520, and a logical group accelerator 530. Each of these subsystems may be included in a single node or may be distributed across multiple nodes and/or executed by separate processors.

RAID controller 502 may be configured to rebuild a failed storage device in response to a storage device failure. For example, RAID controller 502 may be a hardware or software RAID controller for implementing at least one RAID group among two or more storage devices, such as disk drives in a storage array. RAID controller 502 may organize a group of physical storage devices into a plurality of logical recovery units distributed among the storage devices, such as RAID stripes. For example, a data unit, such as a block, may be divided among a number of the storage devices in the RAID group to define a RAID stripe. In some embodiments, parity data may also be calculated and stored in at least one of the storage devices as part of the stripe. In some embodiments, RAID units may be mirrored for increased resiliency.

RAID controller 502 may include a RAID configuration 504. For example, RAID configuration 504 may identify the RAID-level, storage devices in the RAID group, RAID stripe allocation and depth, parity and/or mirroring processes, and/or specific algorithms for implementing these or other RAID-related features. In some embodiments, RAID configuration 504 may identify a set of storage devices (or portions of storage devices) in which to implement a RAID group. For example, RAID configuration 504 may include a list of storage device identifiers designated in a particular RAID group and the RAID logic to be used for writing to and rebuilding storage devices in the RAID group.

In some embodiments, RAID controller 502 may be responsible for allocation of write commands and/or parity storage to implement RAID configuration 504. In some embodiments, the RAID configuration may be implemented by a separate RAID process in the write channel for the storage elements. For example, RAID configuration 504 may be a description of a RAID process and parameters implemented in a selected RAID group by another RAID controller or integrated RAID process and RAID controller 502 may be used only for a rebuild process.

RAID controller 502 may include striping module 506. Striping module 506 may provide RAID stripe information for the data in one or more RAID groups. For example, striping module 506 may include the logical block addresses (LBAs) for each RAID stripe in a RAID group for rebuild. In some embodiments, striping module 506 may include the RAID stripe information for each stripe on each storage device in the set of storage devices that makeup the RAID group. RAID stripe information may include logical address and/or logical mapping information for each storage device and/or key information or algorithms for accessing or calculating the physical locations of each RAID stripe across the storage devices. For example, a RAID stripe distributed across three storage devices may include a first segment on a first drive, a second segment on a second drive, and corresponding parity data on a third drive and the RAID stripe information in striping module 506 will enable RAID controller 502 to access the segments and parity information on any remaining drives to attempt to rebuild the RAID stripe after a failure of one of the three drives.

RAID controller 502 may include device rebuild module 508. In some embodiments, device rebuild module 508 enables RAID controller 502 to rebuild one or more storage devices after a storage device failure. For example, upon failure of a storage device in a RAID group, RAID controller 502 may initiate device rebuild module 508 to rebuild the data from the failed drive on a replacement storage device placed in the same bay the failed storage device is removed from or a hot spare maintained in a different bay. In some embodiments, device rebuild module 508 may be able to rebuild a failed storage device to a replacement storage device with a different type, capacity, interface, or location of storage and/or across multiple replacement storage devices, including storage devices or portions of storage devices present in the storage array when the first storage device failed. Device rebuild module 508 may use RAID configuration 504 and/or striping module 506 to identify and locate RAID stripes and the logical blocks within those RAID stripes for use in the rebuild process.

In some embodiments, device rebuild module 508 may include a rebuild queue 508.1. Rebuild queue 508.1 may identify the rebuild order of the RAID stripes to be rebuilt. For example, rebuild queue 508.1 may access and/or organize the RAID stripes identified in striping module 506 and with stripe units allocated to the failed storage device. These RAID stripes may be placed into a sequential queue for attempted rebuild. In some embodiments, RAID stripes may be placed into rebuild queue 508.1 based on the order in which they were written to the devices, such as last-in-first-out (LIFO) or first-in-first-out (FIFO) order. In some embodiments, placement of RAID stripes in rebuild queue 508.1 may follow an algorithm for increasing rebuild efficiency based on serialization information, physical data locations and access parameters, and/or parallel processing of multiple RAID stripes at the same time.

In some embodiments, rebuild queue 508.1 may also include queuing of RAID segments and/or device logical blocks within each RAID stripe. In some embodiments, the logical block size may be equal to the RAID segment size (also known as stripe depth, stripe length, chunk size, or stride size). In other embodiments, the logical block size may be smaller than the RAID segment size, such as RAID segments implemented at the page-level. In some embodiments, rebuild queue 508.1 may include a list of logical block addresses (LBAs) to be rebuilt using the RAID stripes.

In some embodiments, rebuild queue 508.1 may receive one or more sets of storage locations (such as LBAs or RAID stripes) corresponding to one or more logical data groups with a specified priority from logical group accelerator 530. In some embodiments, rebuild queue 508.1 may replace a default rebuild queue calculated without reference to logical data groups with a logical rebuild queue received from logical group accelerator 530. For example, logical group accelerator may identify a logical rebuild queue based on logical group priority and/or partial rebuild parameters to be used as rebuild queue 508.1. In some embodiments, logical group accelerator 530 may identify one or more priority sets of storage locations to be given priority over other storage locations. For example, device rebuild module 508 may assemble rebuild queue 508.1 based on a rebuild ordering algorithm using the priority sets in conjunction with other rebuild parameters to order the RAID stripes within the priority set.

In some embodiments, device rebuild module 508 may include a logical block progress monitor 508.2 and a stripe progress monitor 508.3. Logical block progress monitor 508.2 may track completion of each logical block successfully recovered and rebuilt to the replacement storage device. Stripe progress monitor 508.3 may track completion of each RAID stripe successfully recovered and rebuilt to the replacement storage device. Logical block progress monitor 508.2 may track rebuild of logical units at a granularity appropriate to the storage device and RAID configuration, such as matched to the native logical block size of the storage device. For example, logical block progress monitor 508.2 may track each LBA that is rebuilt.

Device rebuild module 508 may include a logical group progress monitor 508.4. In some embodiments, a logical group may include any logical data group managed at the file or data object level or higher. For example, each logical data group may correspond to a file or data object represented by a related collection of one or more logical blocks and not necessarily bounded by the RAID configuration or coextensive with a single RAID stripe. In some embodiments, logical data groups may be reserved for logical groups of files or data objects (and their underlying logical blocks), such as namespaces, volumes, or buckets (or similar object containers). In some embodiments, logical data groups may include only abstract logical data groups for application data management that are managed in an application data layer independent of physical storage parameters (e.g. device file systems, LBAs, RAID configuration, etc.), such as data objects, data object containers, and/or global namespaces.

Logical group progress monitor 508.4 may track the progress of one or more logical data groups stored in a RAID group where a storage device has failed and is in the rebuild process. For example, a RAID group may host four different logical data groups, where each logical data group is stored in multiple RAID stripes. Logical group progress monitory 508.4 may track the rebuild progress of each of the logical data groups and store an indicator of whether the rebuild of RAID stripes containing data in the logical data groups has completed. In some embodiments, logical progress monitor 508.4 may use logical block progress monitor 508.2 and/or stripe progress monitor 508.3 to identify what data elements have been rebuilt. For example, logical group progress monitor 508.4 may use logical block progress monitor 508.2 to identify logical data blocks that have been identified as rebuilt. In another example, logical group progress monitory 508.4 may use stripe progress monitor 508.3 and stripe to logical block information in striping module 506 to identify logical blocks that have been rebuilt.

In some embodiments, logical group progress monitor 508.4 may use a logical group index 510 to identify the logical blocks corresponding to each logical data group. For example, logical group index 510 may include logical mapping information for each logical date group stored in the RAID group and logical group progress monitor 508.4 may use the logical mapping information to identify the logical blocks corresponding to the logical data group. Logical group progress monitor 508.4 may compare the logical blocks identified for a group in logical group index 510 to logical blocks that have been rebuilt (as indicated by logical block progress monitor 508.2 or stripe progress monitor 508.3).

In some embodiments, a set of logical data blocks (or other data units) corresponding to each logical data group being monitored may be used to define the set of logical data blocks that must be rebuilt to achieve a rebuild complete status for each logical data group. In some embodiments, logical group progress monitor 508.4 may track and determine completion levels short of rebuild complete status as well. For example, logical group progress monitor 508.4 may identify the total number of blocks in the set of logical data blocks for the logical data group and the number of blocks from the set that have been rebuilt at any given time during the rebuild process. Thus, a number of blocks rebuilt and/or percentage of blocks rebuilt may be tracked.

Device rebuild module 508 may include a rebuild status indicator 508.5. For example, rebuild status indicator 508.5 may include a number of status settings, such as "rebuild not started", "rebuild in progress", "rebuild complete", and "rebuild failed". In some embodiments, rebuild status indicator 508.5 may be a flag, numeric code, string, or other indicator corresponding to the available status settings. Rebuild status indicator 508.5 may be updated by device rebuild module 508 throughout the rebuild process or may only be updated when the process either completes or fails. Rebuild status 508.5 may indicate the rebuild status for the entire contents of the failed storage device. In some embodiments, logical group progress monitor 508.4 may include rebuild status indicators for each logical data group being monitored and may operate independent of rebuild status 508.5.

In some embodiments, device rebuild module 508 may include or be compatible with a user interface, such as a graphical user interface, that provides visual representations of rebuild queue 508.1, logical block progress monitor 508.2, stripe progress monitor 508.3, logical group progress monitor 508.4, and/or rebuild status 508.5. For example, device rebuild module may support a graphical user interface showing rebuild queue 508.1 and progress through rebuild queue 508.1 in terms of logical data blocks, RAID stripes, and/or logical data groups. In some embodiments, a visual or audio alert may be provided when rebuilds of logical blocks (e.g. LBAs), RAID stripes, logical data groups, and/or the full data set from the failed storage device are complete or fail.

Logical group index 510 may be provided to support mapping of rebuild progress and status information from the logical block and RAID stripe information used for the rebuild to the logical data groups. For example, logical group index 510 may include entries, such as fields, tables, lists, or other data structures, for each logical data group with data units stored in the RAID group. In the embodiment shown, logical groups A-n are represented in logical group entries 512, 514, 516 in logical group index 510. While three logical group entries are shown for logical groups designated A, B, and n, entries for any number of logical groups may be included in logical group index 510. Each of logical group entries 512, 514, 516 may include information describing the scope, such as a range of LBAs and/or descriptive metadata, of the corresponding logical data group.

In some embodiments, each of logical group entries 512, 514, 516 may include respective logical group maps 512.1, 514.1, 516.1. For example, each of logical group maps 512.1, 514.1, 516.1 may include logical mapping information from an abstract logical data group to a list of LBAs where the corresponding data elements of the logical data group are stored. In some embodiments, logical group maps 512.1, 514.1, 516.1 may include lists of LBAs or other indicators that may be mapped to LBAs for identifying the physical storage locations of the data elements for the logical data group.

In some embodiments, each of logical group entries 512, 514, 516 may include respective logical group priority indicators 512.2, 514.2, 516.2. For example, each of logical group priority indicators 512.2, 514.2, 516.2 may include one or more fields designating a relative importance or application relationship for the logical data group. In some embodiments, priority may be represented by a numerical relationship among logical groups, such that the first logical group in logical group entry 512 may have a first priority and second logical group in logical group entry 514 may have second priority, where first priority represents "mission critical" and second priority represents "active application". Other priority designations may include "failover data source" or "archival data source". In some embodiments, logical group priority may be defined by a service level agreement related to one or more of the logical groups. In some embodiments, logical group priority may designate one or more applications supported by the logical group and a user designation of application priority may determine logical group priority indicators 512.2, 514.2, 516.2.

In some embodiments, logical group priority indicators 512.2, 514.2, 516.2 may directly or indirectly define a rebuild priority and/or priority groups among logical data groups A-n. For example, each logical group entry 512, 514, 516 may include a numeric priority order for use by logical group accelerator 530. In some embodiments, multiple logical groups with the same priority may be rebuilt together and their corresponding RAID stripes may be interleaved such that one group with the same priority is not completed before another is started and they are processed as a unitary set. For example, all RAID stripes in the combined set may be organized for most efficient rebuild regardless of which logical data group(s) are included in any given RAID stripe, so long as each RAID stripe includes data from the priority set. In other embodiments, multiple logical groups with the same priority may be assigned and ordered within their priority set such that one logical data group is still completed before another is started, even though they have the same priority.

In some embodiments, logical group priority indicators 512.2, 514.2, 516.2 may directly or indirectly define a partial rebuild priority and/or priority group among logical data groups A-n. For example, each logical group entry 512, 514, 516 may include flag for partial rebuild priority for use by logical group accelerator 530.

In some embodiments, each of logical group entries 512, 514, 516 may include respective logical group history data 512.3, 514.3, 516.3. For example, each of logical group history data 512.3, 514.3, 516.3 may include one or more fields designating the read/write usage of the logical data group relative to a user application's access to the logical data group. In some embodiments, logical group history data 512.3, 514.3, 516.3 may include one or more metrics for quantifying a production demand history for each of logical group entries 512, 514, 516, such as number of blocks read, number of blocks written, connection time (e.g. for data streams), etc., as well as time stamps, user/application logs, and/or other data for measuring frequency, types, and patterns of data use. For example, each entry for logical group history data 512.3, 514.3, 516.3 may include data usage counts (reads and writes) against the logical data group across a time-based array. In some embodiments, logical group history data 512.3, 514.3, 516.3 may be maintained for a moving window (hours, days, weeks, months, etc.) or from a specified starting date/time. In some embodiments, logical group history data 512.3, 514.3, 516.3 may include an interface to a separate data repository for historical data usage information related to the respective logical groups A-n.

In some embodiments, a storage access controller 520 may be associated or in communication with RAID controller 502. For example, storage access controller 520 may be responsible for an alert related to the failed storage device and, in response, takes the storage array offline and initiates RAID controller 502 for rebuild. In another example, RAID controller 502 may identify a failed storage device and communicate with storage access controller 520 to take the storage array offline while RAID controller 502 attempts the rebuild process. In some embodiments, storage access controller 520 may include a storage controller associated with the read/write and/or control channels for the storage devices in the storage array that RAID controller 502 manages one or more RAID functions for, such as storage device rebuild.

Storage access controller 520 may include a storage array status indicator 522. Storage access controller 520 may include simple status indicators, such as "offline" and "online", or more complex status indicators related to various stages of production data use, storage failure, and rebuild, recovery, or other data management. In some embodiments, storage array status indicators 522 may designate status indications for an entire storage array, a RAID group, and/or individual devices within an array and RAID group. Storage array status indicator 522 may be provided to other applications and/or application users, including data administrators, to assist in managing and maintaining the storage array and related applications.

In some embodiments, storage array status indicator 522 may include a devices-at-risk indicator 522.1. For example, storage array status indicator 522 may include a table of the storage devices in the array and for each device provide a storage device health status, such as normal, at risk, or failed. In some embodiments, RAID controller 502 may not complete a full rebuild of a failed drive but identify one or more logical data groups for production use from the failed drive based on a partial rebuild (indicated by logical group progress indicator 508.4). In that case, storage access controller 520 may place the logical data groups back into production. In some embodiments, storage array status indicator 522 for the failed drive and/or the entire storage array may be indicated as "at risk" in the event of a partial or failed rebuild.

Storage access controller 520 may also include a storage array definition 524. Storage array definition 524 may define various aspects of the storage array that are relevant to data management and use at the storage node, storage system, application, and/or enterprise level. For example, storage access controller 520 may maintain one or more data structures for describing the storage capacity 524.1, number of storage devices 524.2, quality of service 524.3, and/or logical groups 524.4 supported by the storage array. In some embodiments, logical groups 524.4 may include logical group index 510. These storage array parameters 524.1, 524.2, 524.3, 524.4 may represent the specifications of the available storage for use by one or more applications.

In some embodiments, after a partial rebuild by RAID controller 502, a storage array may be put back into production use for application read/write operations, but with a changed storage array definition to represent the reduced capabilities of the storage array. For example, if a partial rebuild results in ⅔ of a failed storage device being rebuilt, with only three out of the four original logical data groups rebuilt: capacity 524.1 may be reduced by ⅓ (e.g. from 36 TB to 24 TB), the number of drives may stay the same, the quality of service may stay the same, and the logical groups may be reduced from 3 to 4.

Logical group accelerator 530 may include functions for using information from logical group index 510 to accelerate the return of one or more priority logical data groups to production use. For example, logical group accelerator 530 may identify one or more priority levels and associated logical data groups that should be rebuilt ahead of lower priority logical data groups and/or returned to production ahead of lower priority logical data groups. In some embodiments, logical group accelerator 530 may operate in conjunction with RAID controller 502 to organize rebuild queue 508.1, track logical group rebuilds with logical group progress monitor 508.4, and/or suspend further rebuild activities in favor of a partial rebuild. In some embodiments, logical group accelerator 530 may operate in conjunction with storage access controller 520 to enable production use of rebuilt logical data groups in advance of complete rebuild of a failed storage device, for example, for a partial rebuild or production use in parallel with an ongoing rebuild.

In some embodiments, logical group accelerator 530 may include a logical rebuild queue 532. For example, logical rebuild queue 532 may arrange logical data groups in a priority order (e.g. based on logical group priority indicators 512.2, 514.2, 516.2) for use by rebuild queue 508.1. In some embodiments, logical rebuild queue 532 may use logical group priority indicators 512.2, 514.2, 516.2 to place logical data groups in priority order, then use logical group maps 512.1, 514.1, 516.1 to convert the group priority order to priority sets of LBAs and/or an LBA priority order. In some embodiments, logical rebuild queue 532 may then use striping module 506 to convert the priority sets of LBAs to priority sets of RAID stripes or an LBA priority order to a RAID stripe priority order.

In some embodiments, priority sets of LBAs and/or an ordered list of LBAs for priority rebuild may be provided to device rebuild module 508 and used in the generation of rebuild queue 508.1. For example, a priority set of LBAs corresponding to one or more high priority logical data groups for partial rebuild may be used to bound and generate the full list of RAID stripes for the partial rebuild. In some embodiments, priority sets and/or partial rebuild lists (based on priority sets) may be used by device rebuild module 508 in conjunction with other algorithms for generating efficient rebuild orders to generate rebuild queue 508.1 with RAID stripes corresponding to the LBAs of high priority logical data groups appearing in the queue ahead of lower priority logical data groups.

In some embodiments, logical group accelerator 530 may include a priority partial rebuild module 534. Priority partial rebuild module 534 may identify one or more logical data groups for partial rebuild ahead of other logical data groups. For example, in an array with a single mission-critical logical data group and several lower priority logical data groups, priority partial rebuild module 534 may identify that only the single mission-critical logical data group should be rebuilt before putting the storage array. RAID group, and/or rebuilt mission-critical logical data group back into production. Rebuild of the remaining logical data groups (or other data on the failed drive) may be suspended, deferred, or cancelled.

In some embodiments, logical group priority indicators 512.2, 514.2, 516.2 may indicate directly or indirectly whether one or more logical data groups should be selected for a partial rebuild over the remaining data. For example, one or more logical data groups may be necessary for immediate application support, while other logical data groups may relate to redundant or less-used data or applications that may be left offline for some period of time. In some embodiments, logical group priority indicators 512.2, 514.2, 516.2 may be used to identify logical data groups that should be placed back in production based on a threshold priority value. Logical data groups with a priority value that meets or exceeds the threshold priority value may be added to a priority partial rebuild set and forward to device rebuild module 508 for a partial rebuild. In some embodiments, logical group history data 512.3, 514.3, 516.3 may also be used for identifying a set of logical data groups for a priority partial rebuild. For example, recent or periodic access patterns that predict a near-term user or application need for a particular logical data group may be used to identify that logical data group as a candidate for inclusion in the set for the priority partial rebuild.

In some embodiments, when a set of logical data groups have been identified for a priority partial rebuild by priority partial rebuild module 534, the remaining logical data groups or other data may still be rebuilt at a later date/time. Logical group accelerator 530 may include a deferred rebuild scheduler 536 for schedule when the remaining logical data groups or other data may be rebuilt. For example, when one or more logical data groups are suspended from rebuild, they may be placed on a deferred schedule that is time or event-based in deferred rebuild scheduler 536.

In some embodiments, deferred rebuild scheduler 536 may use logical group history data 512.3, 514.3, 516.3 to identify a later time for the deferred rebuild of one or more logical data groups. For example, deferred rebuild scheduler 536 may analyze a production demand history to identify times of greater or less production demand and defer rebuild to a future time with lower predicted production demand for the priority logical data group(s) put into production. In some embodiments, some data groups may be scheduled for deferred rebuild and some data groups may be cancelled (generally based on redundant data being available elsewhere in storage system 1). In some embodiments, multiple rounds of partial rebuilds of logical data groups meeting different priority levels may be scheduled using deferred rebuild scheduler 536.

In some embodiments, logical group accelerator 530 may provide a user interface for enabling a user, such as an administrative data manager, data owner, or application developer/manager, to set or change parameters for logical rebuild queue 532, priority partial rebuild module 534, and/or deferred rebuild scheduler 536. For example, after a storage device has failed, one or more priority rebuild sets of logical data groups, priority partial rebuilds, and/or schedules for deferred rebuilds may be presented to a user for acceptance or modification. In some embodiments, a similar user interface may be used to setup a default configuration of logical group priorities and partial rebuild preferences. For example, a user-defined default configuration may be stored in the logical group priority indicators 512.2, 514.2, 516.2 in logical group index 510.

Figures 6A, 6B:
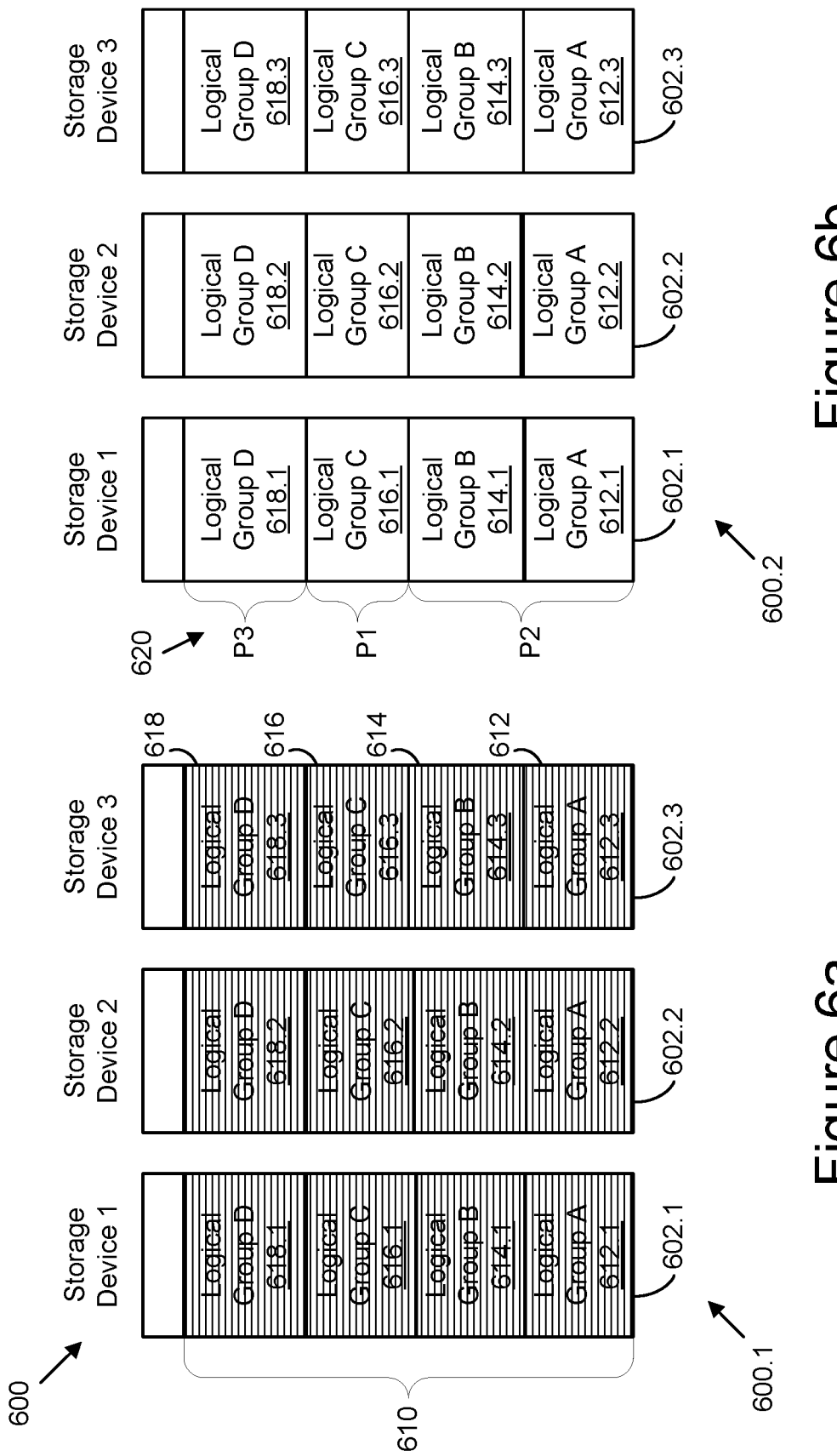
FIGS. 6a and 6b schematically illustrate an example RAID storage array before rebuild and several options for rebuild in a storage system with logical data groups.

FIGS. 6a and 6b show an example storage array 600 arranged in a RAID group. In FIG. 6a storage array 600 is shown in pre-failure operation 600.1 with storage devices 602.1, 602.2, 602.3 operating in a production mode, such as for host read/write operations. In some embodiments, storage array 600 includes four logical data groups 612, 614, 616, 618 written across storage devices 602.1, 602.2, 602.3. For example, logical data groups 612, 614, 616, 618 may be stored in a plurality of RAID stripes 610 with a RAID stripe segment in each of storage devices 602.1, 602.2, 602.3. In some embodiments, the RAID configuration of storage array 600 may include parity data such that some RAID stripe segments are host data and some RAID stripe segments are parity data.

In the example shown, a first logical data group 612 occupies data storage location 612.1 on 602.1, 612.2 on 602.2, and 612.3 on 602.3 and is further divided across RAID stripes 610. A second logical data group 614 occupies data storage location 614.1 on 602.1, 614.2 on 602.2, and 614.3 on 602.3 and is further divided across RAID stripes 610. A third logical data group 616 occupies data storage location 616.1 on 602.1, 616.2 on 602.2, and 616.3 on 602.3 and is further divided across RAID stripes 610. A fourth logical data group 618 occupies data storage location 618.1 on 602.1, 618.2 on 602.2, and 618.3 on 602.3 and is further divided across RAID stripes 610. The same logical data groups 612, 614, 616, 618 are shown in FIGS. 6a and 6b on storage devices 602.1, 602.2, 602.3.

The four logical data groups 612, 614, 616, 618 are shown with their storage locations and related RAID stripes 610 clustered into continuous or sequential blocks. In some implementations, data elements and/or RAID stripes for each of logical data groups 612, 614, 616, 618 may be mixed and distributed among storage locations on the storage media in storage devices 602 without regard to which logical data group 612, 614, 616, 618 they belong. For example, a series of RAID stripes on the media may include stripes from different logical groups, such as A, B, B, C, A, D, A, A, B, C, C, B, C, D, D, D.

In an example failure event, one of storage devices 602.1, 602.2, 602.3 fails. In some embodiments, failure is indicated by failure to successfully read, write, and/or recover host data to or from one of storage devices 602.1, 602.2, 602.3. Failure may be detected by one or more systems or controllers in a storage system or may be identified by one or more system users. In some embodiments, failure may include complete failure of a storage device, where no read recovery is possible within the storage system. Failure may also include partial failure where one or more media components or other features of a storage device cease to operate normally and partial read of some stored data may be possible. Various procedures for attempted recovery and partial recovery may be used prior to identifying a storage device as failed. Failure to recover some or all of the data on a storage device may trigger a rebuild process to a replacement storage device.

In FIG. 6b, storage array 600 is shown during a rebuild process 600.2. RAID stripes 610 are not shown in FIG. 6b but may still be present and used for rebuild process 600.2. Note that one of storage devices 602.1, 602.2, 602.3 has failed and the failed storage device has been replaced with a replacement storage device for the rebuild. For example, storage device 602.1 may have failed and the original storage device has been removed and replaced with a replacement storage device to receive the rebuilt data based on the remaining data in storage devices 602.2 and 602.3.

Rebuild process 600.2 may proceed in any order according to the rebuild queue of a RAID controller. For example, rebuild may proceed from the bottom of storage devices 602 and proceed toward the top, which would result in logical groups being rebuilt in order from group A to group B to group C to group D. Or, it may be rebuilt from the top to the bottom in reverse order, group D to group C to group B to group A. In some systems, data elements are written to storage device locations without reference to logical data groups and a rebuild process may proceed in an a rebuild queue ordered based on physical locations and rebuild efficiency without regard to logical data groups. For example, RAID stripes may be rebuilt in the order they were written or based on adjacent physical blocks in the storage media, resulting in a series of RAID stripes being rebuilt from different logical groups in the rebuild queue, such as A, B, B, C, A, D, A, A, B, C, C, B, C, D, D, D.

In FIG. 6b, logical data groups 612, 614, 616, 618 have been assigned priorities for use in the rebuild process. Logical group C 616 has been assigned first priority (P1). Logical group A 612 and logical group B 614 have been assigned second priority (P2). Logical group D 618 has been assigned third priority (P3). The assigned priorities may be used for ordering the rebuild queue such that higher priority data group(s) (with P1 being the highest priority and P3 being the lowest) are rebuilt prior to lower priority data groups. In some embodiments, priority groups may also be used to designate partial rebuilds and/or schedule deferred rebuilds of lower priority logical groups.

For example, logical group C has been assigned a logical group priority of 1. The rebuild queue may be assembled and ordered with all RAID stripes 610 that include data from logical group C before any RAID stripes that include only data from other data groups. In some embodiments, the RAID controller may identify the RAID stripes in the first priority group, such as using LBA addresses that correspond to logical group C, in a first priority set of RAID stripes. The RAID controller may then order the RAID stripes within the first priority set according to an efficiency algorithm for the rebuild. In some embodiments, first priority settings may be configured to place the logical data group 616 back into production as soon as the rebuild is complete. In some embodiments, first priority settings may be configured for a partial rebuild that suspends, defers, or cancels the rebuild of additional (lower priority) logical data groups 612, 614, 618.

In some examples, the rebuild process may continue to second priority logical data groups 612, 614. In some embodiments, the second priority rebuild may be a continuous rebuild queue with the first priority set of RAID stripes or it may be a separate rebuild queue loaded after the priority 1 rebuild queue is complete. In some embodiments, the second priority rebuild may be completed continuously from the first priority set or may be suspended or deferred to a later time. A second priority rebuild queue (or portion of a rebuild queue) may be assembled and ordered with all RAID stripes 610 that include data from logical groups A and B before any RAID stripes that include only data from logical group D (priority 3). In some embodiments, the RAID controller may identify the RAID stripes in the second priority groups, such as using LBA addresses that correspond to logical groups A and B, in a second priority set of RAID stripes. The RAID controller may then order the RAID stripes within the second priority set according to an efficiency algorithm for the rebuild. In some embodiments, ordering the second set of RAID stripes with two logical groups may result in interleaving RAID stripes with data from the two logical groups, such that rebuild of both logical groups may proceed at the same time. For example, one logical group may not complete rebuild before the other logical group is at least started.

In some embodiments, second priority settings may be configured to place the logical data groups 612, 614 back into production as soon as the rebuild of the second priority set is complete. In some embodiments, second priority settings may be configured for a partial rebuild that suspends, defers, or cancels the rebuild of additional (lower priority) logical data group 618 and/or data not assigned to a logical data group.

In some examples, the rebuild process may continue to third priority logical data group 618. In other examples, third priority rebuild may be cancelled and only a partial rebuild of the first priority set and second priority set may be completed. The third priority rebuild may be a continuous rebuild queue following the first priority set and the second priority set of RAID stripes or it may be a separate rebuild queue loaded after the second priority rebuild queue is complete. The third priority rebuild may be completed continuously from the second priority set or may be suspended or deferred to a later time. A third priority rebuild queue (or portion of a rebuild queue) may be assembled and ordered with all RAID stripes 610 that include data from logical group D and/or any remaining RAID stripes in the failed storage device not included in the first and second priority sets. A third (or final) priority set of RAID stripes 610 may be identified and ordered for the rebuild.

Upon completion of the rebuild of the final priority set, rebuild of the failed storage device, RAID group, and/or storage array may be complete. Due to the risks of the rebuild process, it is possible that rebuild may fail at some point in the rebuild process. In an example where the priority sets that have already completed at the time of rebuild failure have not been placed back in production, the completed priority sets may be enable for production. So, for example, if logical group C has been rebuilt but not placed into production and rebuild fails during rebuild of the second priority group, logical group C may be put into production based on the partially rebuild failed storage device (and related RAID group and storage array).

Figure 7:
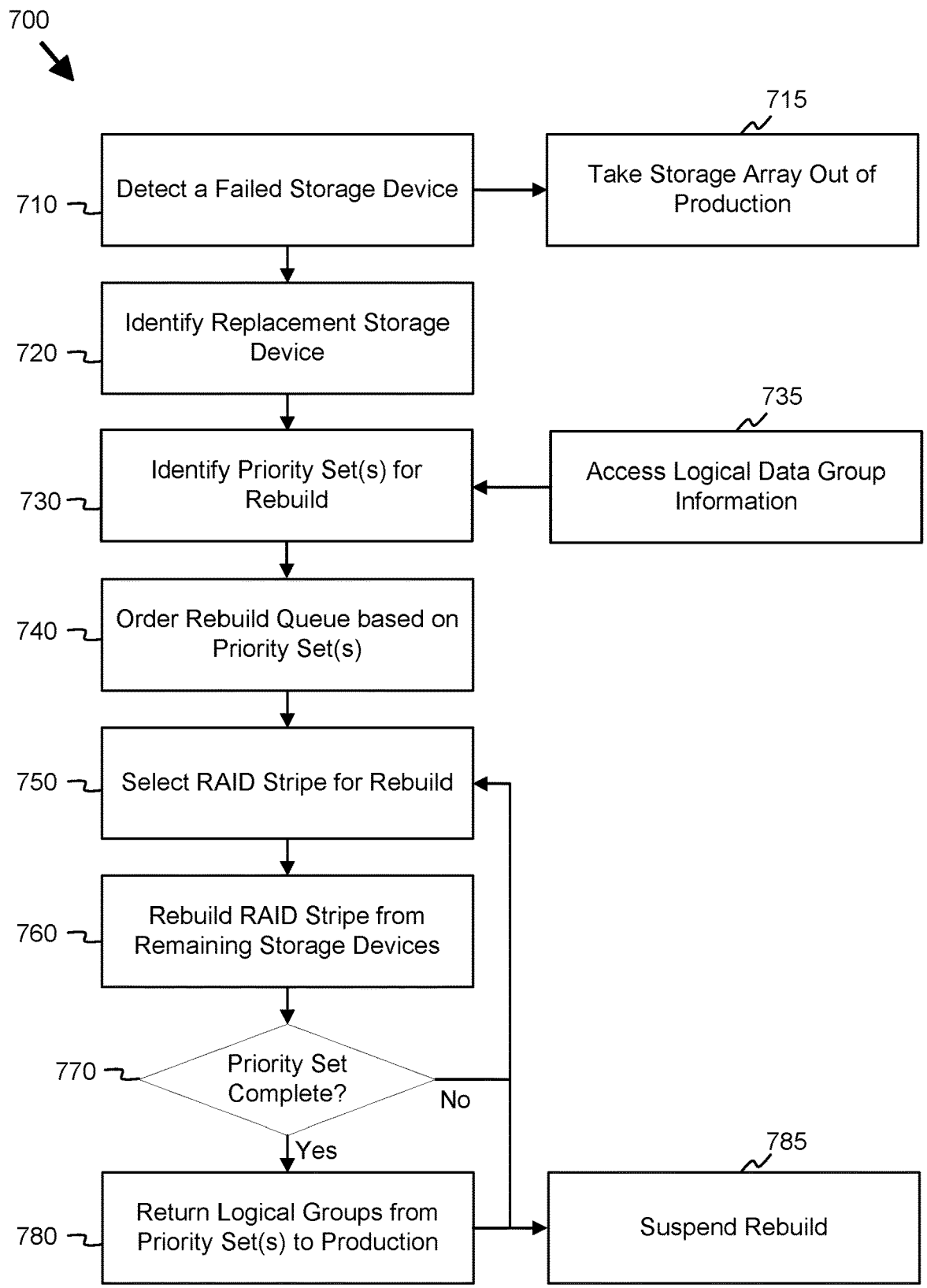
FIG. 7 illustrates an example embodiment of a method for RAID rebuild of a failed storage device using a storage system with logical data groups.

As shown in FIG. 7, the storage system 1 may be operated according to a rebuild method for data storage arrays containing logical data groups, i.e. according to the method 700 illustrated by the blocks 710-785 of FIG. 7.

At block 710, a failed storage device is detected in the storage array. For example, a storage device in a RAID group in the storage array may be diagnosed with a complete or partial failure. In some embodiments, the failed storage device may be detected by a storage controller, RAID controller, storage node component, and/or administrative user and a RAID rebuild process may be initiated. In some embodiments, the storage array may be taken out of production at block 715 while the rebuild process is started.

At block 720, a replacement storage device is identified for use in the rebuild process. For example, the failed storage device may be removed from a bay in the storage array and a new storage device may be placed in the bay to be the replacement storage device. In another example, the storage array may include one or more hot spares that may be selected for use as the replacement storage device and/or available capacity on one or more existing storage devices may be allocated to receiving the rebuilt data elements from the failed storage device. In some embodiments, a portion of the data on the failed storage device may have still been accessible and moved to the replacement storage device or otherwise made available for the rebuild process.

At block 730, one or more priority sets for rebuild are identified from logical data group information. For example, the failed storage device may include several logical data groups that have been assigned different priorities for rebuild and each priority level may be assembled into a priority set of data locations for rebuild. In some embodiments, the priority set may include a set of RAID stripes and/or a set of LBAs corresponding to the logical data group or groups within the priority set. In some embodiments, multiple priority sets may be identified, such as a first priority set with highest priority, a second priority set with normal priority, and a third priority set with lowest priority. In some embodiments, logical data group information may be accessed at block 735 from a data source, such as a logical group index including mapping and priority information for each logical data group.

At block 740, a rebuild queue may be ordered for a rebuild order based on one or more priority sets. For example, a first priority set may identify the highest priority RAID stripes for rebuild. In some embodiments, multiple priority sets may be identified at block 730 and the rebuild queue may be organized with all RAID stripes in the first priority set ahead of RAID stripes in the second priority set. In some embodiments, the RAID stripes within a priority set may be organized according to a rebuild efficiency algorithm. In some embodiments, the rebuild queue may be a single continuous rebuild queue containing multiple priority sets or may be distinct rebuild queues for each priority set.

At block 750, a RAID stripe is selected for rebuild. For example, the rebuild queue may define the rebuild order in which the RAID stripes in the failed storage device are to be rebuilt and the next RAID stripe in the queue may be selected.

At block 760, the selected RAID stripe is rebuilt. For example, one or more RAID segments from remaining storage devices are selected and used to rebuild the corresponding RAID segment from the RAID stripe from the failed storage device. In some embodiments, the RAID segment from the failed storage device is generated, at least in part, from a host data segment on one remaining storage device and a parity data segment on another remaining storage device. The rebuilt RAID segment from the failed storage device is written to the replacement storage device. Each RAID segment from the failed storage device may be logged as it is successfully rebuilt.

At block 770, the completion status of at least one priority set including one or more logical groups may be evaluated. For example, the rebuilt LBAs from the RAID stripes may be compared against one or more lists of LBAs corresponding to one or more logical data groups. In some embodiments, the rebuilt RAID segments are compared against the RAID segments identified for one or more priority sets for completion of a priority set. If no new priority sets have been completed, then method 700 may return to block 750 to select the next RAID stripe for rebuild. If a new logical data group has been completed, then method 700 may continue to block 780.

At block 780, the logical data groups that have been completed may be returned to production. For example, each logical data group in a completed priority group may be returned to production as it is completed based on a priority setting. In some embodiments, each logical data group may have a priority indicator that indicates that the logical data group should be returned to production immediately following rebuild of all of its LBAs and not wait for complete rebuild (or rebuild failure) of the RAID group.

In some embodiments, completion of a priority set and the return of one or more logical data groups to production may trigger a suspension (or cancellation) of the remaining rebuild process (for lower priority sets) at block 785. For example, when a first priority set completes rebuild, the associated logical data group may be placed into production and the rebuild process may be suspended until a future time or event, such as a deferral schedule, change in usage volume for the production logical groups, or other data management factors. In some embodiments, the rebuild process may be suspended until a future time when a production demand on the logical data groups returned to production is reduced. For example, the rebuild process may be suspended until a future time based on an analysis of the production demand history and a predicted reduction in demand. In some embodiments, a demand threshold may be used for event-based restart of the rebuild process when future production demand drops below the demand threshold.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage system, comprising:
a plurality of storage devices configured as a storage array for storing a plurality of logical data groups distributed among the plurality of storage devices;
a redundant array of independent disks (RAID) controller configured to write the plurality of logical data groups in a configuration of RAID stripes across at least one RAID group in the plurality of storage devices, the RAID controller comprising:
a rebuild module configured to rebuild a failed storage device from the plurality of storage devices based on the configuration of RAID stripes; and
a rebuild queue defining a rebuild order for logical blocks of the failed storage device;
a logical group index comprising a logical group map for each of the plurality of logical data groups, wherein the logical group map identifies logical blocks corresponding to each logical data group of the plurality of logical data groups; and
a logical group accelerator module configured to order the rebuild queue based on the plurality of logical data groups, wherein the RAID stripes that include a first priority set of logical blocks corresponding to at least one logical data group of the plurality of logical data groups are ordered ahead of the RAID stripes that include a remaining set of logical blocks not in the first priority set of logical blocks in the rebuild queue;
wherein, the rebuild module is further configured to rebuild the RAID stripes that include the first priority set of logical blocks before the RAID stripes that include the remaining set of logical blocks for a remaining logical data group from the plurality of logical data groups.

2. The storage system of claim 1, further comprising:
a storage access controller configured to enable the first priority set of logical blocks to be used for production read/write operations:
responsive to the rebuild module completing a rebuild of the RAID stripes that include the first priority set of logical blocks; and
before the rebuild module completes a rebuild of the RAID stripes that include the remaining set of logical blocks for the remaining logical data group from the plurality of logical data groups.

3. The storage system of claim 2, wherein the storage access controller is further configured for redefining, responsive to enabling the first priority set of logical blocks to be used for production read/write operations, the at least one RAID group to include only the first priority set of logical blocks.

4. The storage system of claim 2, wherein:
the first priority set of logical blocks is enabled for use for production read/write operations at a first time following the first priority set of logical blocks being rebuilt and before the remaining set of logical blocks for the remaining logical data group is rebuilt; and
the storage system further comprises:
a deferred rebuild scheduler configured to:
suspend the rebuild of the remaining set of logical blocks for the remaining logical data group at the first time; and
resume the rebuild of the remaining set of logical blocks for the remaining logical data group at a later second time.

5. The storage system of claim 4, wherein:
the first time corresponds to a first production demand for read/write operations to the first priority set of logical blocks;
the later second time corresponds to a second production demand for read/write operations to the first priority set of logical blocks; and
the second production demand is less than the first production demand.

6. The storage system of claim 5, wherein:
the logical group index includes a production demand history for at least one logical data group of the plurality of logical data groups; and
selection of the later second time is based on the production demand history for the at least one logical data group corresponding to the first priority set of logical blocks.

7. The storage system of claim 1, wherein:
the plurality of logical data groups includes:
a first logical data group in the first priority set of logical blocks; and
a second logical data group in a second priority set of logical blocks; and
the storage system further comprises:
a storage access controller configured to:
enable, responsive to the first priority set of logical blocks being rebuilt at a first rebuild time, the first priority set of logical blocks to be used for production read/write operations; and
enable, responsive to the second priority set of logical blocks being rebuilt at a second rebuild time that is after the first rebuild time, the second priority set to be used for production read/write operations.

8. The storage system of claim 1, wherein:
the logical group index includes a group priority for each logical data group of the plurality of logical data groups; and
the logical group accelerator module is further configured to order the rebuild queue based on the group priority of each logical data group of the plurality of logical data groups for rebuilding the plurality of logical data groups in a priority order.

9. The storage system of claim 8, wherein:
the first priority set of logical blocks includes at least two logical data groups from the plurality of logical data groups;
the group priorities of the at least two logical data groups are equal; and
the group priority of the remaining logical data group is different than the group priorities of the at least two logical data groups in the first priority set of logical blocks.

10. The storage system of claim 9, wherein the RAID stripes containing logical blocks for the at least two logical data groups in the first priority set of logical blocks are rebuilt in a logical group rebuild order that interleaves RAID stripes from the at least two logical data groups.

11. A computer-implemented method, comprising:
accessing a logical group index for a plurality of storage devices configured as a storage array for storing a plurality of logical data groups distributed among the plurality of storage devices, wherein:
the logical group index comprises a logical group map for each logical data group of the plurality of logical data groups; and
the logical group map identifies logical blocks corresponding to each logical data group of the plurality of logical data groups;
writing the plurality of logical data groups in a configuration of redundant array of independent disks (RAID) stripes across at least one RAID group in the plurality of storage devices; and
responsive to a failed storage device failing among the plurality of storage devices:
identifying a replacement storage device for rebuilding the failed storage device;
ordering a rebuild queue based on the plurality of logical data groups, wherein:
a first priority set of logical blocks corresponding to at least one logical data group of the plurality of logical data groups are ordered ahead of a remaining set of logical blocks not in the first priority set of logical blocks in the rebuild queue, and
the RAID stripes that include the first priority set of logical blocks are rebuilt before the RAID stripes that include the remaining set of logical blocks for a remaining logical data group from the plurality of logical data groups; and
rebuilding the failed storage device to the replacement storage device based on the configuration of RAID stripes in a priority order of the rebuild queue.

12. The computer-implemented method of claim 11, further comprising:
enabling the first priority set of logical blocks to be used for production read/write operations:
responsive to completing a rebuild of the RAID stripes that include the first priority set of logical blocks; and
before completing a rebuild of the RAID stripes that include the remaining set of logical blocks for the remaining logical data group from the plurality of logical data groups.

13. The computer-implemented method of claim 12, further comprising:
redefining, responsive to enabling the first priority set of logical blocks to be used for production read/write operations, the at least one RAID group to include only the first priority set of logical blocks.

14. The computer-implemented method of claim 12, wherein:
the first priority set of logical blocks is enabled for use for production read/write operations at a first time following the first priority set of logical blocks being rebuilt and before the remaining set of logical blocks for the remaining logical data group are rebuilt; and
the method further comprises:
suspending the rebuild of the remaining set of logical blocks for the remaining logical data group at the first time;
selecting a later second time; and
resuming the rebuild of the remaining set of logical blocks for the remaining logical data group at the later second time.

15. The computer-implemented method of claim 14, wherein:
the first time corresponds to a first production demand for read/write operations to the first priority set of logical blocks;
the later second time corresponds to a second production demand for read/write operations to the first priority set of logical blocks; and
the second production demand is less than the first production demand.

16. The computer-implemented method of claim 15, wherein:
the logical group index includes a production demand history for the at least one logical data group of the plurality of logical data groups; and
selecting the later second time is based on the production demand history for the at least one logical data group corresponding to the first priority set of logical blocks.

17. The computer-implemented method of claim 11, wherein:
the plurality of logical data groups includes:
a first logical data group in the first priority set of logical blocks; and
a second logical data group in a second priority set of logical blocks; and
the method further comprises:
enabling, responsive to the first priority set of logical blocks being rebuilt at a first rebuild time, the first priority set of logical blocks to be used for production read/write operations; and
enabling, responsive to the second priority set of logical blocks being rebuilt at a second rebuild time that is after the first rebuild time, the second priority set to be used for production read/write operations.

18. The computer-implemented method of claim 11, wherein:
the logical group index includes a group priority for each logical data group of the plurality of logical data groups; and
ordering the rebuild queue is based on the group priority of each logical data group of the plurality of logical data groups for rebuilding the plurality of logical data groups in the priority order.

19. The computer-implemented method of claim 18, wherein:
the first priority set of logical blocks includes at least two logical data groups from the plurality of logical data groups;
the group priorities of the at least two logical data groups are equal; and
the group priority of the remaining logical data group is different than the group priorities of the at least two logical data groups in the first priority set of logical blocks.

20. A system, comprising:
means for accessing a logical group index for a plurality of storage devices configured as a storage array for storing a plurality of logical data groups distributed among the plurality of storage devices, wherein:
the logical group index comprises a logical group map for each logical data group of the plurality of logical data groups; and the logical group map identifies logical blocks corresponding to each logical data group of the plurality of logical data groups;

means for writing the plurality of logical data groups in a configuration of redundant array of independent disks (RAID) stripes across at least one RAID group in the plurality of storage devices;

means for identifying a replacement storage device for rebuilding a failed storage device;

means for ordering a rebuild queue based on the plurality of logical data groups, wherein:
  a first priority set of logical blocks corresponding to at least one logical data group of the plurality of logical data groups are ordered ahead of a remaining set of logical blocks not in the first priority set of logical blocks in the rebuild queue, and
  the RAID stripes that include the first priority set of logical blocks are rebuilt before the RAID stripes that include the remaining set of logical blocks for a remaining logical data group from the plurality of logical data groups; and means for rebuilding the failed storage device to the replacement storage device based on the configuration of RAID stripes in a priority order of the rebuild queue.

* * * * *